(12) United States Patent
Kwasniewicz et al.

(10) Patent No.: US 6,311,832 B1
(45) Date of Patent: Nov. 6, 2001

(54) INDEXING BELTLESS MAGNETIC CONVEYOR

(75) Inventors: Ron W. Kwasniewicz, Walled Lake; Dennis Trestain, Charlotte, both of MI (US)

(73) Assignee: Magnetic Products, Inc., Highland, MI (US)

( * ) Notice: Subject to any disclaimer, the term of this patent is extended or adjusted under 35 U.S.C. 154(b) by 0 days.

(21) Appl. No.: 09/553,117

(22) Filed: Apr. 20, 2000

Related U.S. Application Data

(60) Provisional application No. 60/130,714, filed on Apr. 22, 1999.

(51) Int. Cl.[7] .................................................. B65G 35/00
(52) U.S. Cl. ............................................................. 198/619
(58) Field of Search ............................. 198/619; 104/165

(56) References Cited

U.S. PATENT DOCUMENTS

| | | | |
|---|---|---|---|
| 1,343,648 | * 6/1920 | Smith | 198/619 |
| 3,712,472 | * 1/1973 | Elliott | 198/619 |

OTHER PUBLICATIONS

Brochure—Lahr Conveyors For the Pressroom, Diversatool, Inc.
Brochure—Modular Slug–Vayor The Economical Solution to your Material Transporting Needs, Woodcraft Conveyors, 1991.
Brochure—Increase Efficiency with Bunting Low Profile and Special–Purpose Conveyors, Bunting Magnetics, Co.
Brochure—Model AAA Ultra–Low Profile Model, Livonia Magnetics.

\* cited by examiner

Primary Examiner—Joseph E. Valenza
(74) Attorney, Agent, or Firm—Bliss McGlynn & Nolan, P.C.

(57) ABSTRACT

A beltless magnetic conveyor assembly including a housing defining a longitudinal length of the conveyor and a magnetic rack assembly moveably supported in the housing. The magnetic rack assembly includes a plurality of magnet assemblies supported at spaced intervals relative to one another along the longitudinal length of the conveyor. The beltless magnetic conveyor assembly also includes a drive system which is operable to index the magnetic rack assembly between a home position proximate to one end of the housing and an end position which is proximate to an opposite end of the housing over the same path. The magnet assemblies are operable to generate a magnetic force which acts to attract ferromagnetic material toward the housing and to move the ferromagnetic material in the direction of the longitudinal length of the conveyor when the magnet rack assembly is indexed in one direction. However, the magnet assemblies are also operable to change the force such that ferromagnetic materials are not moved in the direction of the longitudinal length of the conveyor when the magnet rack assembly is indexed in the opposite direction over the same path.

14 Claims, 7 Drawing Sheets

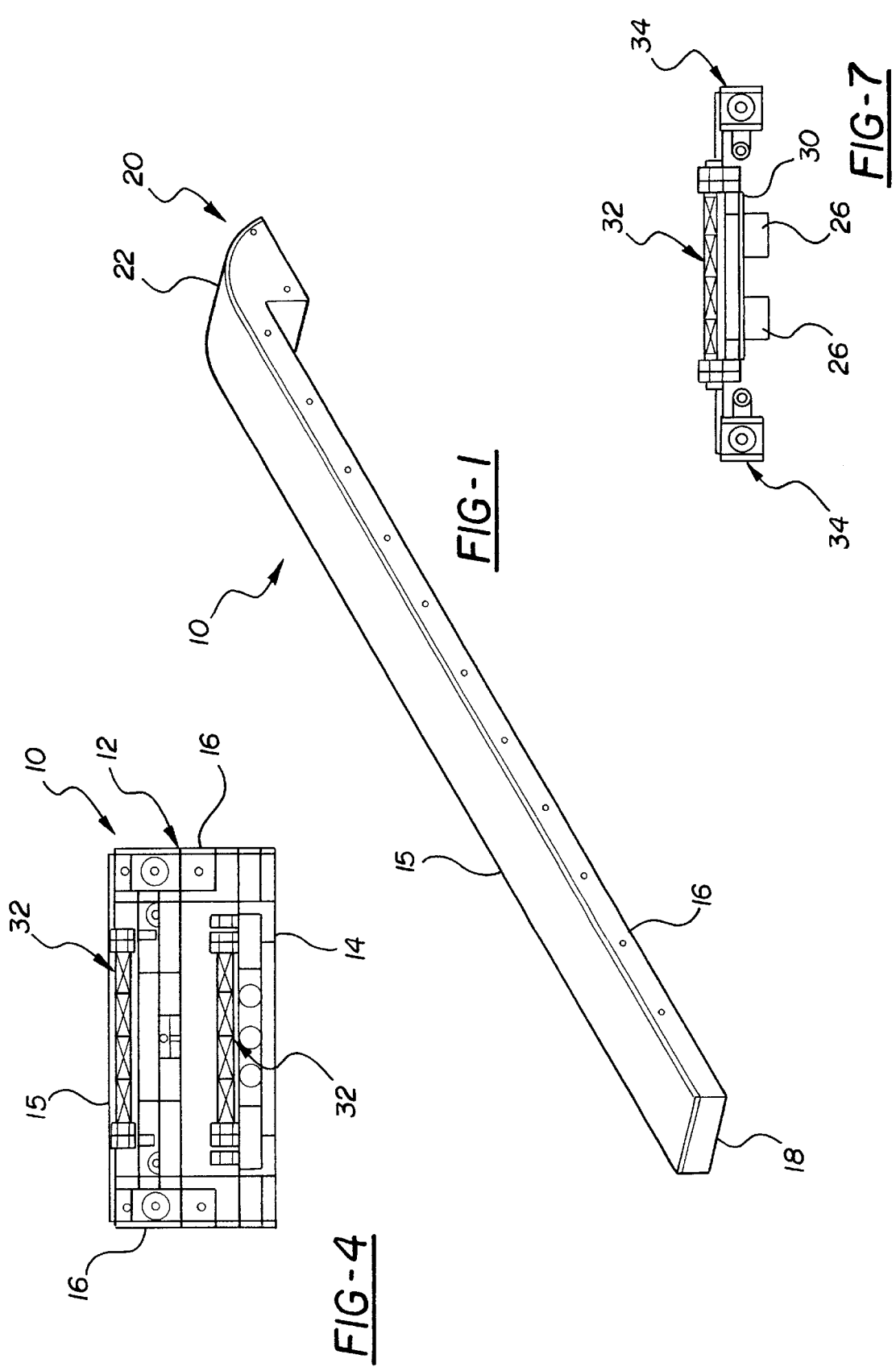

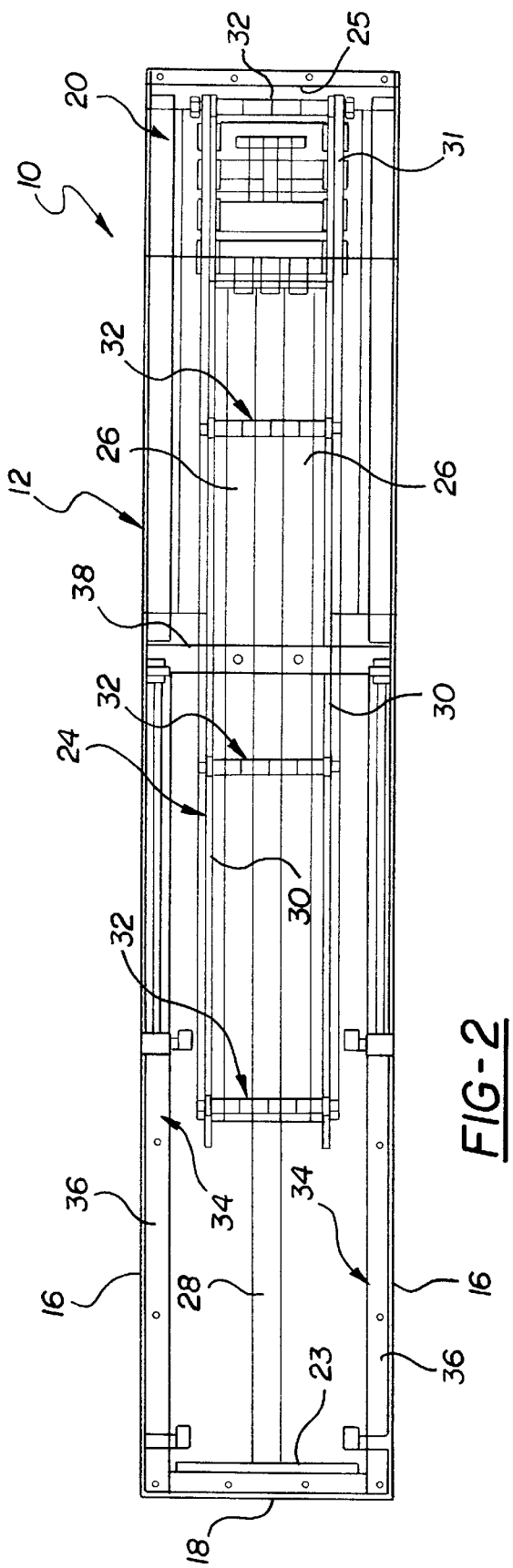
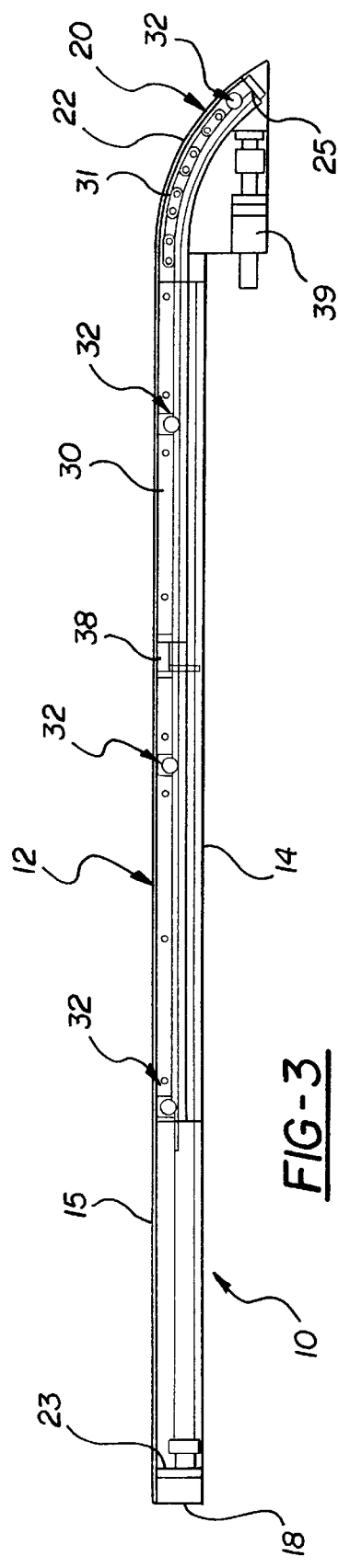

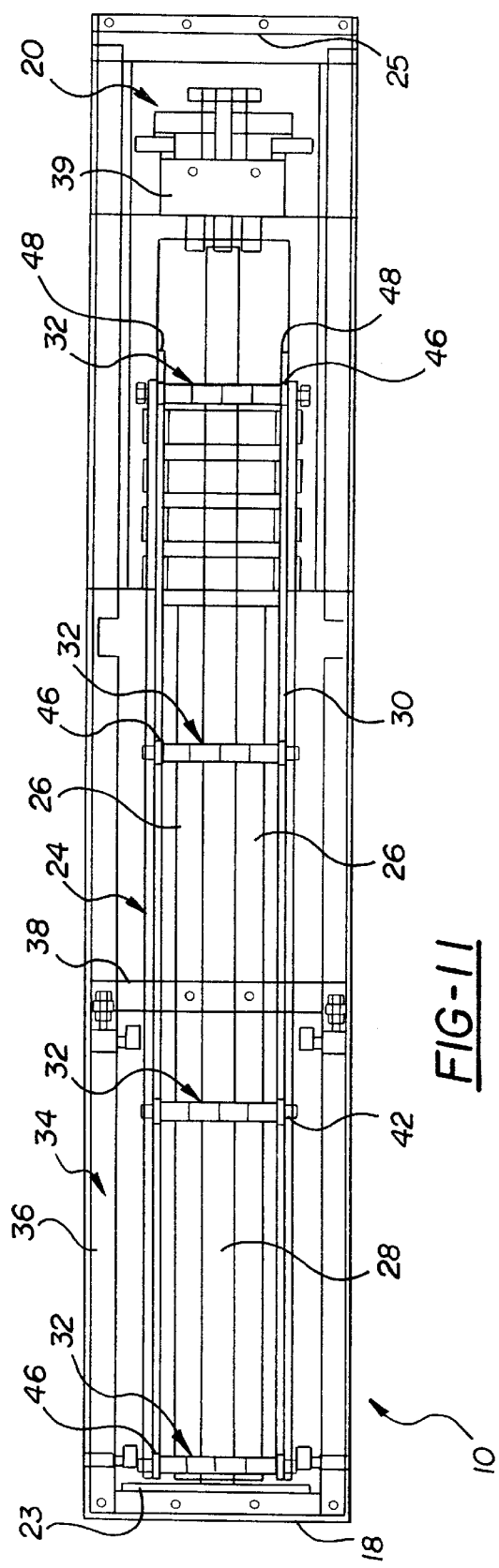
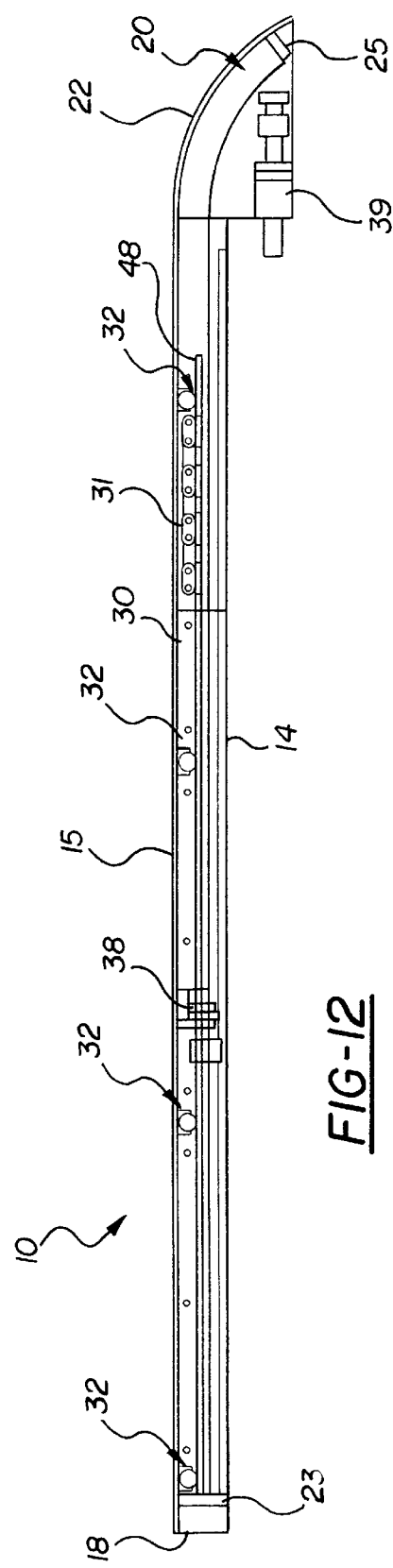
FIG-11
FIG-12

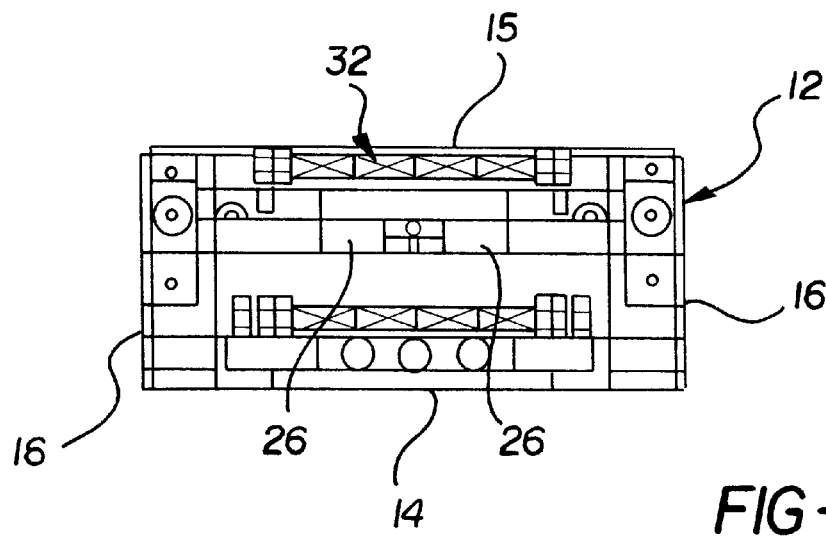
FIG-13
FIG-16
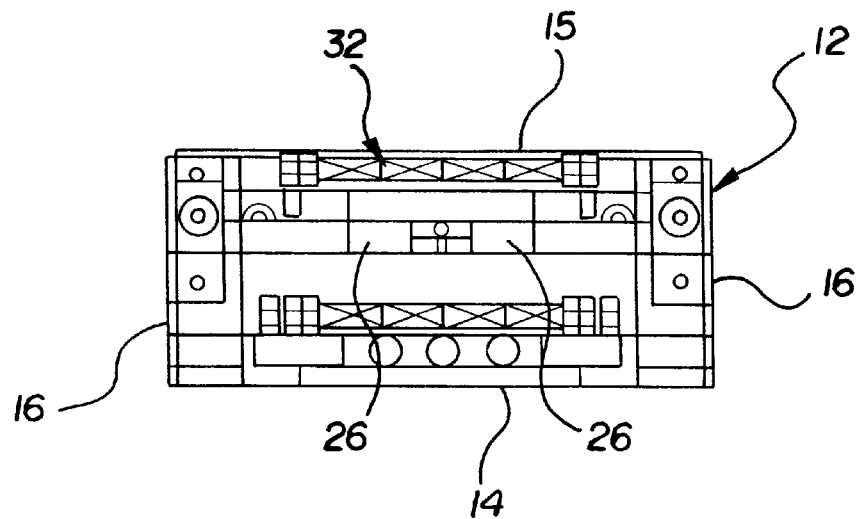

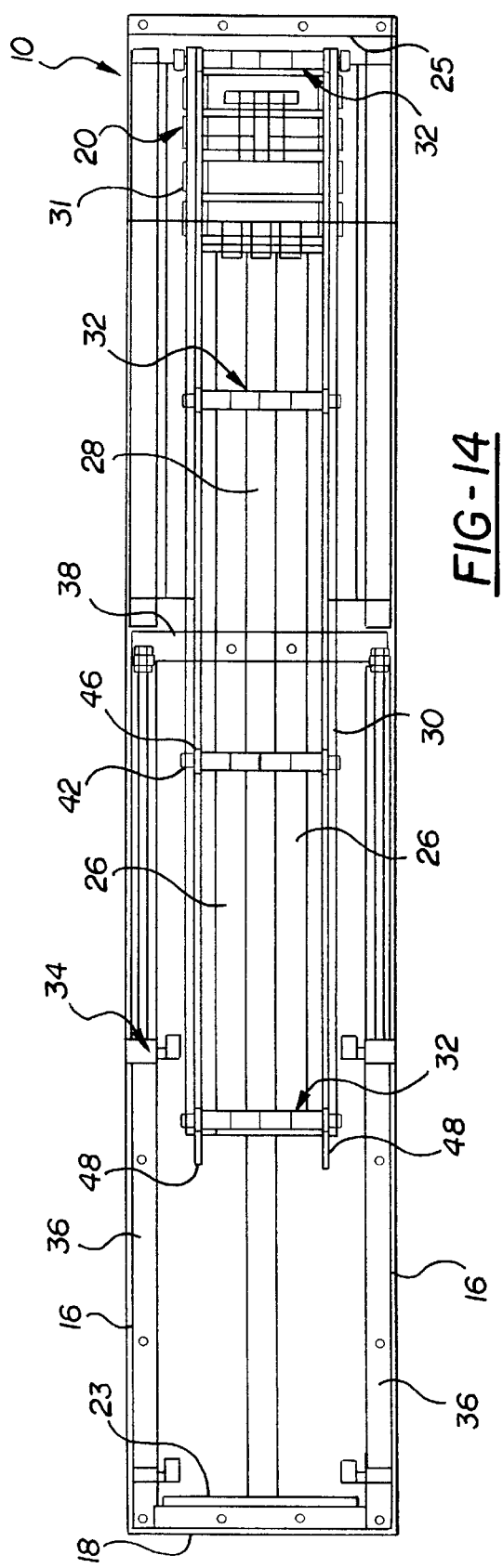
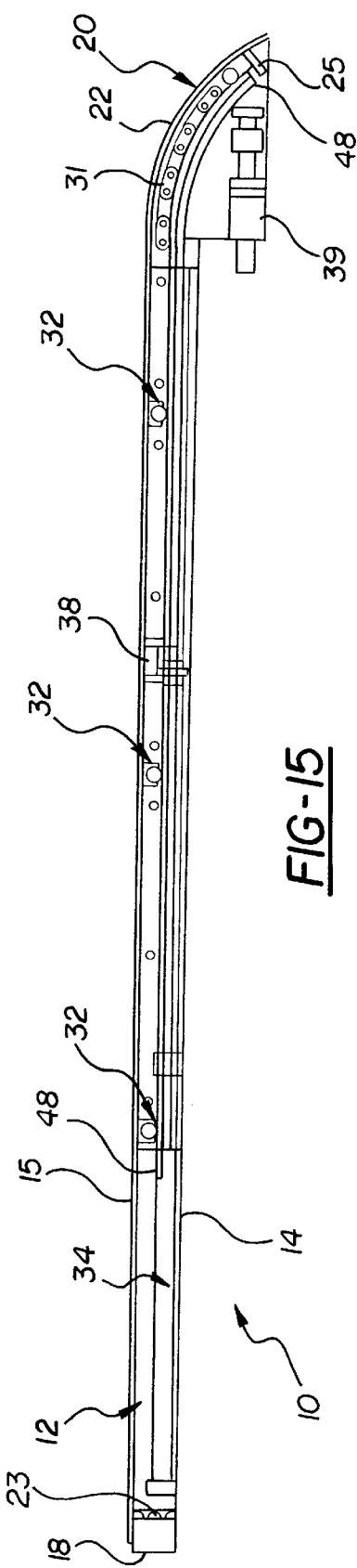
FIG-14
FIG-15

INDEXING BELTLESS MAGNETIC CONVEYOR

This application claims benefit of Prov. No. 60/130,714 filed Apr. 22, 1999.

BACKGROUND OF THE INVENTION

1. Field of the Invention

The present invention is directed toward beltless conveyors and, more specifically, to an indexing beltless magnetic conveyor.

2. Description of the Related Art

Conveyors are well known material handling devices which have application in a wide variety of environments for transporting objects from one place to another. For example, one type of conveyor employs a belt formed into an endless loop which is entrained about at least a pair of rollers spaced apart from one another and usually located at the opposed marginal ends of the conveyor. The rollers have sprockets at either end thereof. The spaced rollers are interconnected by a pair of chains entrained about the sprockets at either end of the rollers. An electric or hydraulic motor is usually employed to power the sprockets and continuously moves the belt over a substantial length of the conveyor between the rollers. In this way, objects may be transported by the conveyor over its length.

Conveyors find application in manufacturing environments. For example, in metal stamping operations, conveyors are employed to move parts between successive presses or from a press into a bin. In addition, conveyors are used for inspecting, transporting and assembly situations and can assist in maximizing production by removing parts, slugs or other scrap and materials from under low clearance areas like punch press dies and permitting continuous operation of the press. However, belted conveyors suffer from the disadvantage that the belts are often cut by the sharp edges of the metal parts formed in stamping operations. The useful life of the belts are reduced and the belts must be replaced more frequently. Frequent belt replacement increases the maintenance costs of the stamping operation. Further, stamped parts and other debris may pass through the damaged belts and jam or foul the inner workings of the conveyor drive system.

In part to avoid these problems, beltless conveyors are often employed in certain manufacturing operations. Metal parts are supported on a stainless steel or other non-magnetic slide surface. A plurality of strong magnets are movably supported at spaced increments beneath the non-magnetic slide surface along the length of the conveyor. The magnets cause the metal parts to be moved along the slide surface of the conveyor. Beltless magnetic conveyors obviously do not suffer from cuts or worn belts and thus have been adopted in numerous manufacturing environments. Water-tight beltless magnetic conveyors have even been submerged in coolant used in drilling, boring or other metal cutting operations. The magnetic conveyors clean the used coolant of metal or ferromagnetic contaminants so that the coolant may be recycled.

While magnetic conveyors have overcome significant problems associated with the belted conveyors of the related art, disadvantages still exist. The drive system employed to move the magnets within the conveyor is relatively complex and expensive. Like their belted counterparts, the magnetic conveyors employ sprockets supported spaced apart from one another in a housing. The sprockets are interconnected by chains or some other mechanism. Movement of the chain causes the magnet to be translated along the length of the conveyor. Parts are discharged from the conveyor as the magnets are moved about the axis of the sprocket and away from the slide surface. The magnets are then facing away from the slide surface which reduces or eliminates the magnetic attraction of the parts to the slide surface. The magnets are then cycled back toward the start of the conveyor. A hydraulic or electric motor is mounted to a motor mount located adjacent to the housing and powers at least one of the sprockets. Further, such conveyors of this type usually employ an internal take up or adjustment mechanism to ensure proper chain tension between the sprockets. An oil bath is usually located in the housing to keep all moving parts adequately lubricated.

The complexity and expense of such drive systems has become a major factor in limiting the use of magnetic conveyors in industry today. Further, as the drive systems have become more complex, the risk that any given component may break, jam or fail has also increased. Magnetic conveyors presently employed in the related art are heavy pieces of machinery which are not portable. In fact, after two to three years, magnetic conveyors are often discarded rather than reused in a different manufacturing line.

The size and particularly the thickness of magnetic conveyors have also limited their use in some circumstances. More specifically, the diameter of the sprocket required to move the magnet within the conveyor housing, the number and size of the magnets used in any given conveyor and the clearance for the magnets as they are cycled from the end of the conveyor back to the start while spaced underneath and away from the slide surface all contribute to the need for a relatively thick housing when compared with the belted conveyors.

Thus, there remains a need in the art for a conveyor that is not as susceptible to damage from sharp edges of stamped metal parts and, which at the same time, does not require a relatively complex, self-lubricating drive system. Further, there remains a need in the art for such a conveyor which presents a thin profile, is lightweight and which is also cost-effective.

SUMMARY OF THE INVENTION

The present invention overcomes these disadvantages in the related art in a beltless magnetic conveyor assembly including a housing defining a longitudinal length of the conveyor and a magnetic rack assembly moveably supported in the housing. The magnetic rack assembly includes a plurality of magnet assemblies supported at spaced intervals relative to one another along the longitudinal length of the conveyor. The beltless magnetic conveyor assembly also includes a drive system which is operable to index the magnetic rack assembly between a home position proximate to one end of the housing and an end position which is proximate to an opposite end of the housing over the same path. The magnet assemblies are operable to generate a magnetic force which acts to attract ferromagnetic material toward the housing and to move the ferromagnetic material in the direction of the longitudinal length of the conveyor when the magnet rack assembly is indexed in one direction. However, the magnet assemblies are also operable to change the force such that ferromagnetic materials are not moved in the direction of the longitudinal length of the conveyor when the magnet rack assembly is indexed in the opposite direction over the same path.

In this way, ferromagnetic materials are advanced over the length of the conveyor until they are discharged. The indexing nature of the drive system allows movement of the magnets in either direction over the same substantially linear path. No sprockets are required which greatly reduces the thickness of the conveyor. In addition, less magnets may be employed when compared to conventional magnetic conveyors of the related art to move material over the same distance. There is no heavy motor nor motor mounts required to drive the conveyor. In addition, the conveyor of the present invention is lightweight, thin, relatively inexpensive and is robust and efficient in operation.

BRIEF DESCRIPTION OF THE DRAWINGS

Other advantages of the invention will be readily appreciated as the same becomes better understood by reference to the following detailed description when considered in connection with the accompanying drawings, wherein:

FIG. 1 is a perspective view of the indexing beltless magnetic conveyor of the present invention;

FIG. 2 is a top view of the indexing beltless magnetic conveyor of the present invention with the slide surface of the housings removed;

FIG. 3 is a cross-sectional side view of the indexing beltless magnetic conveyor of the present invention;

FIG. 4 is a cross-sectional end view of the indexing beltless magnetic conveyor illustrated in FIG. 2;

FIG. 7 is an end view of the magnet rack assembly illustrated in FIG. 6;

FIG. 11 is a top view of the indexing beltless magnetic conveyor of the present invention illustrating the magnet rack assembly in the home position;

FIG. 12 is a cross-sectional side view of the indexing beltless magnetic conveyor illustrated in FIG. 11;

FIG. 13 is a cross-sectional end view of the indexing beltless magnetic conveyor illustrated in FIG. 12;

FIG. 14 is a top view of the indexing beltless magnetic conveyor of the present invention illustrating the magnet rack assembly in the end position;

FIG. 15 is a cross-sectional side view of the indexing beltless magnetic conveyor illustrated in FIG. 14; and FIG. 16 is a cross-sectional end view of the indexing beltless magnetic conveyor illustrated in FIG. 15.

DETAILED DESCRIPTION OF THE PREFERRED EMBODIMENT(S)

Figure 5:
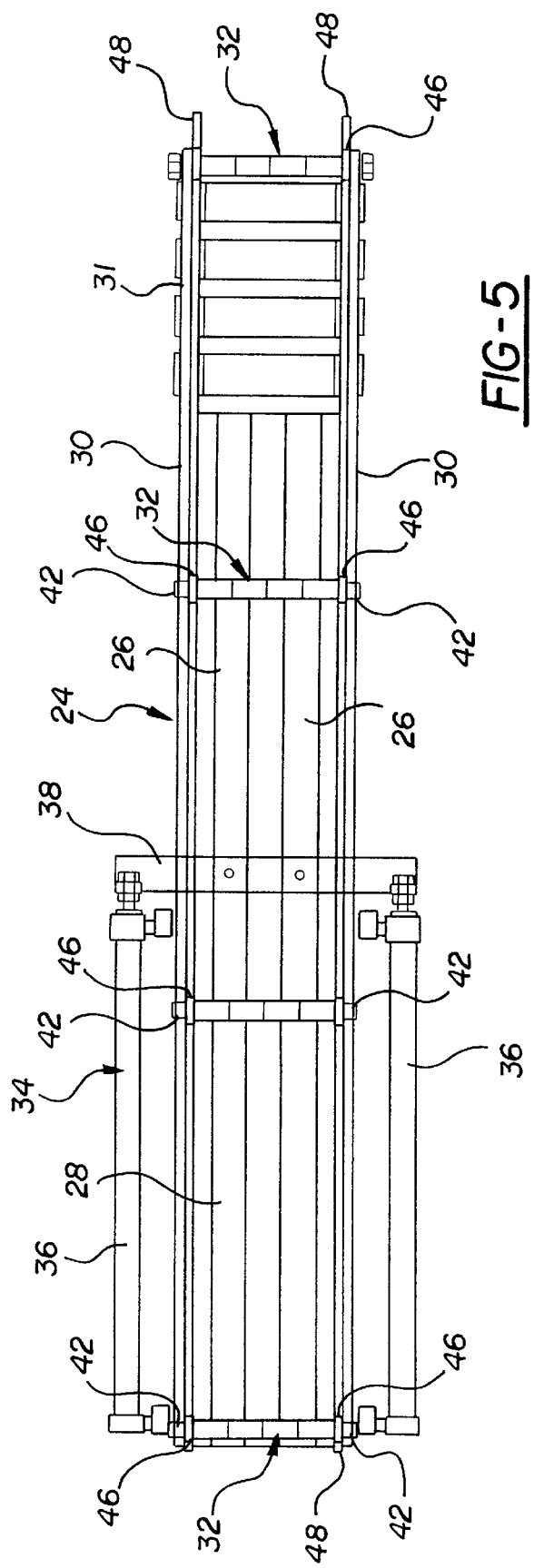
FIG. 5 is a top view of the magnet rack assembly for the indexing beltless magnetic conveyor of the present invention.

An indexing beltless magnetic conveyor of the present invention is generally indicated at 10 in FIGS. 1 through 4 and 11 through 16 where like numerals are used to designate like structure throughout the drawings. The conveyor 10 may be employed in any number of applications and neither the preceding discussion nor the description of the invention which follows should be interpreted as limiting the use of the present invention. Further, throughout the following discussion, the conventions "home" and "end" may be employed to indicate where the conveyor may first begin to transport ferromagnetic materials and where such transportation may end. However, these conventions are meant to facilitate the description of the invention and are not meant to be limiting in any way.

Referring now to FIGS. 1 through 4, the conveyor 10 of the present invention includes a housing, generally indicated at 12, and which defines the longitudinal length of the conveyor 10. A magnetic rack assembly, generally indicated at 24, is movably supported within the housing 12 and includes a plurality of magnet assemblies, generally indicated at 32, which are supported at spaced intervals relative to one another along the longitudinal length of the conveyor. The present invention also includes a drive system, generally indicated at 34. The drive system 34 is operable to index the magnetic rack assembly 24 between a "home" position which is proximate to one end of the housing 10 and an "end" position which is proximate to an opposite end of the housing over the same path. Each of the magnet assemblies 32 is operable to generate a magnetic force which acts to attract ferromagnetic material toward the housing 10 and to move the ferromagnetic material in the direction of the longitudinal length of the conveyor 10 when the magnet rack assembly 24 is indexed in one direction. However, each of the magnet assemblies 32 is further operable to change the magnetic force such that ferromagnetic materials are not moved in the direction of the longitudinal length of the conveyor 10 when the magnet rack assembly 24 is indexed in the opposite direction over the same path. The operation of the beltless magnetic conveyor 10 of the present invention to achieve this result will be described in greater detail below.

The housing 12 has a bottom 14 and a non-magnetic slide surface 15 spaced from the bottom 14 and over which the ferromagnetic material is moved as will be described in greater detail below. A pair of side walls 16 extend between the slide surface 15 and the bottom 14 of the housing 12. As best shown in FIGS. 1 and 3, the magnetic conveyor 10 of the present invention enjoys a relatively low profile which facilitates its use in tight quarters. The housing 12 also has a rear wall 18 located at one end of the conveyor 10 and a head 20 located at the opposite end of the conveyor. The slide surface 15 defines a main longitudinal plane of the conveyor 10 and the head 20 presents an arcuate discharge surface 22 which curves below the main longitudinal plane for discharging ferromagnetic parts, materials, etc. from the conveyor.

Figure 6:
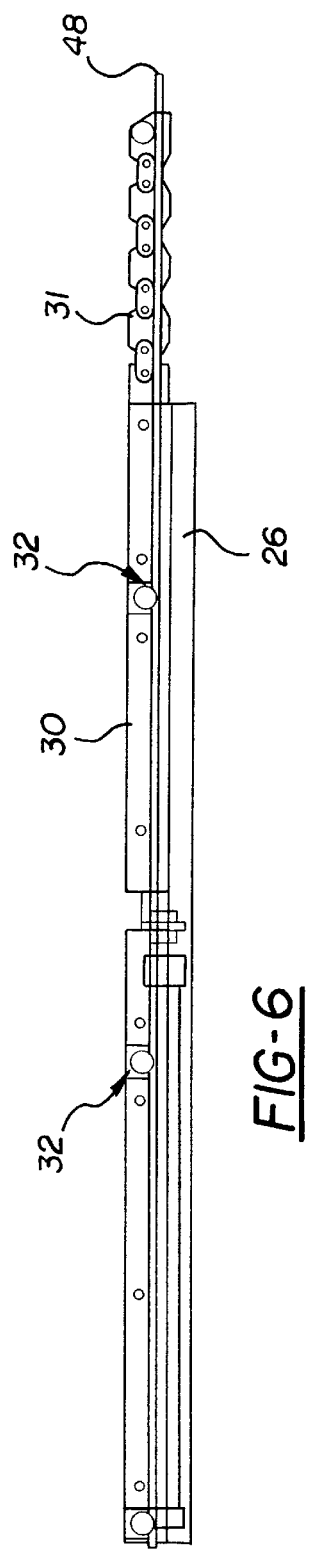
FIG. 6 is a side view of the magnet rack assembly illustrated in FIG. 5.

As best shown in FIGS. 1 and 5 through 7, the magnet rack assembly 24 is supported within the housing 12 and beneath the slide surface 15. The magnet rack assembly 24 includes at least two track supports 26 spaced from one another and extending for a portion of the longitudinal length within the housing 12. The track supports 26 are movable along a portion of the length of the conveyor 10 as will be described below. A center track support 28 is disposed between the two other track supports 26 but is fixed to the bottom 14 of the housing 12. Both types of track supports 26, 28 may be made of ultra high molecular weight materials such as NSM, Nylatron, Uhmin, Delrin, etc. A pair of tracks 30 are disposed on the outboard side of the two track supports 26 and are also movable along at least a portion of the longitudinal length of the housing 12. At least one, but preferably a pair of racks 48 extending in the direction of the longitudinal length of the conveyor 10. The pair of racks 48 are supported by the pair of tracks 30 on the magnet rack assembly 24. Furthermore, the racks 48 are supported for indexing movement with the magnet rack assembly 24 between the "home" and "end" positions. However, the rack 48 are slightly longer than the magnetic rack assembly 32 and are also movable independently relative to the magnet rack assembly 24, per se, at the home and end positions, as will be described in greater detail below.

As noted above, the drive system 34 is operable to index the magnet rack assembly 24 between a home position proximate to one end of the conveyor associated with the rear wall 18 and an end position proximate to the other end of the conveyor associated with the discharge surface 22 over the same path. More specifically and as illustrated in the preferred embodiment, the magnet rack assembly 24 is indexed between a home position wherein the assembly 24 abuts a rear rubber stop 23 mounted to the rear wall 18 of the housing 12 as shown in FIGS. 11 through 12 and a forward, stop position wherein the assembly 24 abuts the front rubber stop 25 at the end of the head 20 as shown in FIGS. 14 through 16. A flexible head track assembly 31 facilitates movement of the rail assembly 24 over the arc of the discharge surface 22 defined by the head 20. In the preferred embodiment, the flexible head track assembly 31 may include a plurality of links which allow for movement over the curved path defined by head 20.

The indexing drive system 34 includes at least one pneumatic cylinder 36 mounted, for example, next to a side wall 16 within the housing 12. In the preferred embodiment disclosed herein, however, the drive system 34 includes two pneumatic cylinders 36 supported adjacent both side walls 16 within the housing 12. The pneumatic cylinders 36 are operatively connected to the magnet rack assembly 24 by a cylinder connector 38 extending between the pair of pneumatic cylinders 36. The cylinder connector 38 translates rectilinear movement from the pneumatic cylinders 36 to the magnet rack assembly 24 via the tracks 30. Actuation of the pneumatic cylinders 36 is controlled by a sealless pneumatic valve assembly 39 mounted in the head 20 of the conveyor 10 as best shown in FIG. 3. The valve assembly 39 is a commercially available component available, for example, from Numatics, Inc. located in Highland, Mich. The valve assembly 39 is operatively coupled with the pneumatic cylinder 36 via conduits, not shown, but which are commonly known in the art.

Figure 8:
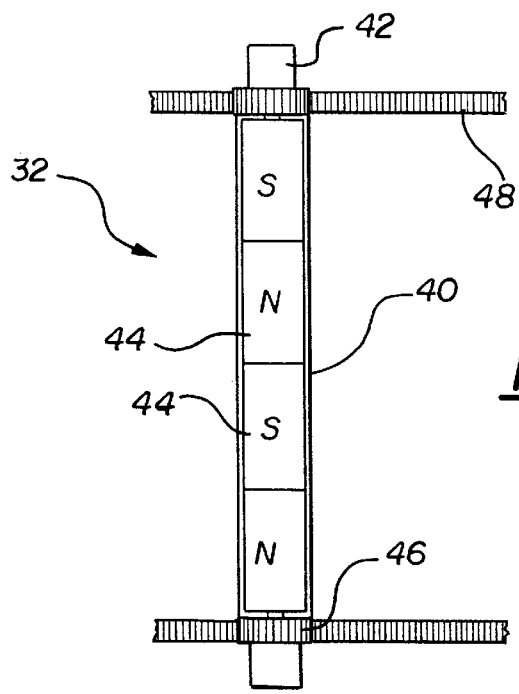
FIG. 8 is a top view of the magnet assembly illustrating the magnet actuating mechanism of the present invention.
Figure 10:
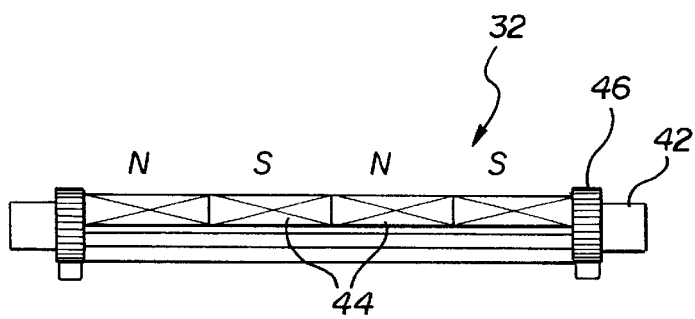
FIG. 10 is an end view of the magnet assembly of the present invention.
Figure 9:
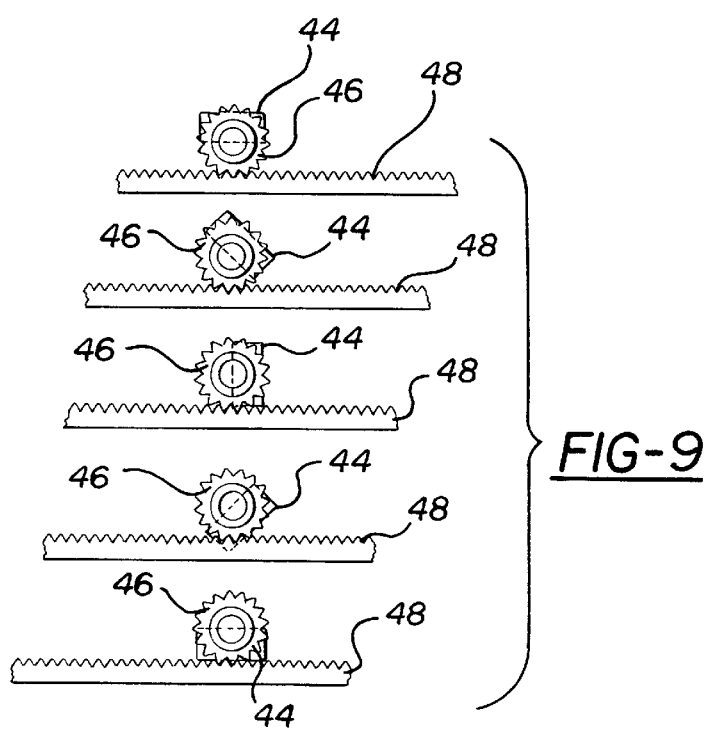
FIG. 9 is an evolutionary side view illustrating the magnet actuating mechanism of the present invention.

Referring now to FIGS. 5 and 8 through 10, each of the magnet assemblies 32 defines a longitudinal axis which is disposed substantially transverse to the longitudinal length of the conveyor 10. Furthermore, each of the magnet assemblies 32 is rotatable about their respective longitudinal axes. The magnet assemblies 32 are operable to rotate from a "on" position wherein the magnetic force attracts ferromagnetic materials to the slide surface 15 of the housing 12 and an "off" position wherein the magnetic force is directed substantially away from the slide surface 15 such that movement of the magnetic rack assembly 24 from its "end" position to its "home" position does not move the ferromagnetic material in the direction of the longitudinal length of the conveyor. Each magnet assembly 32 has a housing 40 which is supported at either end by bearings 42 for rotation about the magnet assembly's longitudinal axis. More specifically, each bearing 42 is operatively connected to the magnet rack assembly 24 such that the housings 40 are rotatable about their longitudinal axes relative to the magnet rack assembly 24 via the bearings 42. In turn, the housing 40 supports a plurality of magnets 44 arranged such that alternate north and south poles are adjacent to one another. In the preferred embodiment disclosed herein, the magnets 44 are neodymium iron boron magnets. However, those having ordinary skill in the art will appreciate that any suitable magnet material may be used or that a single magnet 44 may be supported within the magnet housing 40.

Each of the magnet assemblies 32 includes at least one pinion gear 46 which is disposed in meshing engagement with a rack 48. However, in the preferred embodiment, each of the magnet assemblies 32 includes a pair of pinion gears 46 which are disposed at each end of the magnet assemblies 32 and in meshing engagement with an associated one of the pair of racks 48. Movement of the racks 48 relative to the magnet rack assembly 24 at the "home" position is operable to rotate the magnet assemblies from their "off" position wherein the magnetic force is directed substantially away from the slide surface 15 to the "on" position wherein the magnetic force attracts ferromagnetic materials to the slide surface 15 of the housing. Furthermore, movement of the racks 48 relative to the magnet rack assembly 24 at the "end" position is operable to rotate the magnet assemblies from their "on" position to their "off" position wherein the magnetic force is directed substantially away from the slide surface 15 and the ferromagnetic materials are discharged from the conveyor 10. The purpose of this feature will be explained in connection with the operation of the conveyor as set forth below.

OPERATION

As illustrated in FIGS. 11 and 12, the magnet rack assembly 24 is in its home position. In this position, a portion of each rack 48 is exposed at the end of the magnet rack assembly 24 opposite the rear wall 18 of the housing 12. Here, the working or magnetic flux generating surfaces of each of the magnets 44 of the spaced, transversely disposed magnet assemblies 32 are facing the slide surface 15 of the housing 12. The magnets 44 are therefore said to be "on" and any ferromagnetic material supported on the slide surface 15 is attracted to the magnets 44 through the slide surface 15.

The pneumatic cylinders 36 are actuated so that they extend to move the magnet rack assembly 24 longitudinally along a substantial length of the conveyor 10. This movement advances these magnet assemblies 32 in the same manner which causes any ferromagnetic material to also advance by moving over the slide surface 15.

The magnet rack assembly 24 continues to advance until it comes into abutting contact with the front stop 25. Contact with the stop 25 moves the racks 48 rearward such that a portion of each rack 48 is exposed on the opposite side of the magnet rack assembly 24. Movement of the rack 48 rearward acts on the pinion gears 46 causing the magnet housings 40 to rotate about their longitudinal axes to the "off" position. In the preferred embodiment shown in the progressive views of FIG. 9, the magnets 44 are rotated 180° until their working or magnetic flux generating surfaces are facing directly away from the slide surface 15. The magnets 44 are thus said to be "off" and the attraction between the magnets 44 and any ferromagnetic material supported on the slide surface 15 is substantially reduced or eliminated. However, while the magnets 44 illustrated in these figures are rotated 180°, those having ordinary skill in the art will appreciate that the magnets may be rendered essentially ineffective by rotating them less than 180° or by otherwise directing the magnetic force in a direction which renders the magnets "off" for purposes of moving ferromagnetic parts along the conveyor 10 without departing from the scope of the invention. Similarly, the magnets 44 may be shielded such that they are no longer useful for moving ferromagnetic parts along the conveyor 10. Notwithstanding the structure which is disclosed herein to turn the magnets "on" and "off", those having ordinary skill in the art will appreciate that there are a number of ways in which this may be accomplished without departing from the scope of the invention disclosed herein.

The pneumatic valve assembly 39 located in the head 20 then reverses the direction of the fluid power to the pneumatic cylinders 36 causing them to retract. This moves the magnet rack assembly 24 back over the same path through which it was advanced until the magnet rack assembly 24 comes into abutting contact with the rear stop 23. This contact moves the exposed rack 48 forward which, in turn, acts on the pinion gears 46 to rotate the magnet housing 40 in a reverse direction, preferably 180° about their longitudinal axes. This also rotates the individual magnets 44 such that their working surfaces are once again facing the slide surface 15. The magnet assemblies 32 are thus said to be in their "on" position. The pneumatic valve assembly 41 again reverses the direction of the fluid power to the pneumatic cylinders 36 causing them to extend which then advances the magnet rack assembly 24 forward along a substantial length of the conveyor 10 as described above.

In this way, ferromagnetic materials are advanced over the sliding surface 15 of the conveyor 10 until they are discharged from the head 20. The indexing nature of the drive system 34 of the present invention allows movement of the magnets 44 in either direction over the same substantially linear path. The magnets 44 are actuated or turned "on" simultaneously at one end of the conveyor and deactivated or turned "off" simultaneously at the other end of the conveyor. In the preferred embodiment, the activation and deactivation of the magnets are accomplished by rotation of the magnet assemblies 32 about their longitudinal axes which extend substantially transverse to the length of the conveyor 10. No sprockets are required which greatly reduces the thickness of the conveyor 10. In addition, less magnets may be employed when compared to conventional magnetic conveyors of the related art to move material over the same distance. There is no heavy motor nor motor mount required to drive the conveyor 10 of the present invention. All of these advantages result in a lightweight, thin, relatively inexpensive conveyor which is robust and efficient in operation.

The invention has been described in an illustrative manner. It is to be understood that the terminology which has been used is intended to be in the nature of words of description rather than of limitation. Those having ordinary skill in the art will appreciate that many modifications and variations of the invention are possible in light of the above teachings. Therefore, within the scope of the appended claims, the invention may be practiced other than as specifically described.

We claim:

1. A beltless magnetic conveyor assembly comprising:
   a housing defining a longitudinal length of the conveyor, a magnetic rack assembly movably supported in said housing and including a plurality of magnet assemblies supported at spaced intervals relative to one another along the longitudinal length of the conveyor;
   a drive system which is operable to index said magnetic rack assembly between a home position proximate to one end of said housing and an end position proximate to an opposite end of said housing over the same path;
   each of said magnet assemblies being operable to generate a magnetic force which acts to attract ferromagnetic material toward said housing and to move the ferromagnetic material in the direction of the longitudinal length of the conveyor when the magnet rack assembly is indexed in one direction but which are further operable to change the force such that ferromagnetic materials are not moved in the direction of the longitudinal length of the of the conveyor when the magnet rack assembly is indexed in the opposite direction over the same path.

2. A beltless magnetic conveyor assembly as set forth in claim 1 wherein said conveyor housing includes a slide surface over which the ferromagnetic material is supported as it is moved in the direction of the longitudinal length of the conveyor, said magnet assemblies operable to rotate from an "on" position wherein said magnetic force attracts ferromagnetic materials to said slide surface of said housing and an "off" position wherein said magnetic force is directed substantially away from said slide surface such that movement of said magnet rack assembly from said end position to said home position does not move the ferromagnetic material in the direction of the longitudinal length of the conveyor.

3. A beltless magnetic conveyor assembly as set forth in claim 2 wherein each of said magnet assemblies defines a longitudinal axis which is disposed substantially transverse to the longitudinal length of the conveyor with each of said magnet assemblies being rotatable about their respective longitudinal axes.

4. A beltless magnetic conveyor assembly as set forth in claim 3 wherein each of said magnet assemblies includes a housing having a bearing located at either end of said housing with each bearing being operably connected to said magnet rack assembly, said housing being rotatable about said longitudinal axis relative to said magnet rack assembly via said bearings.

5. A beltless magnetic conveyor assembly as set forth in claim 4 wherein said housing supports a plurality of magnets having opposed north and south pole, said plurality of magnets disposed relative to one another such that alternate north and south poles of sequentially disposed magnets are adjacent to one another.

6. A beltless magnetic conveyor assembly as set forth in claim 4 wherein said housing supports a single magnet.

7. A beltless magnetic conveyor assembly as set forth in claim 2 wherein said magnet rack assembly includes a rack extending in the direction of the longitudinal length of the conveyor, said rack being supported for indexing movement with said magnet rack assembly between said home and end positions and moveable independently relative to said magnet rack assembly at said home and end positions;
   each of said magnet assemblies including a pinion gear in meshing engagement with said rack such that movement of said rack relative to said magnet rack assembly at said home position is operable to rotate said magnet assemblies from said "OFF" position wherein said magnetic force is directed substantially away from said slide surface to said "ON" position wherein said magnetic force attracts ferromagnetic materials to said slide surface of said housing, and such that movement of said rack relative to said magnetic rack assembly at said end position is operable to rotate said magnet assemblies from said "ON" position to said "OFF" position wherein said magnetic force is directed substantially away from said slide surface and the ferromagnetic materials are discharged from the conveyor.

8. A beltless magnetic conveyor assembly as set forth in claim 7 wherein said magnet rack assembly includes a pair of racks disposed on either side thereof and wherein each of said magnet assemblies includes a pair of pinion gears disposed at each end of said magnet assemblies and in meshing engagement with an associated one of said pair of racks so as to rotate said magnet assemblies between said "ON" and "OFF" positions.

9. A beltless magnetic conveyor assembly as set forth in claim 8 wherein said magnet rack assembly includes at least two track supports disposed spaced relative to one another and extending for a portion of the longitudinal length of said housing, at least two tracks which are disposed on the outboard side of said associated track supports, said pair of racks being supported by said pair of tracks on said magnet rack assembly.

10. A beltless magnetic conveyor assembly as set forth in claim 2 wherein said conveyor housing includes a bottom disposed spaced from said slide surface and a pair of side walls extending between said bottom and said slide surface, a rear wall which defines one extent of said home position of said housing and a head located at the opposite end of the conveyor and which defines the furthest extent of said end position of said conveyor.

11. A beltless magnetic conveyor assembly as set forth in claim 10 wherein said slide surface defines a main longitudinal plane of the conveyor and said head presents an arcuate discharge surface which curves below said main longitudinal plane of the conveyor for discharging ferromagnetic materials therefrom.

12. A beltless magnetic conveyor assembly as set forth in claim 1 wherein said indexing drive system includes at least one pneumatic cylinder supported within said housing and operatively connected to said magnet rack assembly for providing substantially rectilinear, indexing movement to said magnet rack assembly between said home and end positions.

13. A beltless magnetic conveyor assembly as set forth in claim 12 wherein said indexing drive system farther includes a pneumatic valve assembly which controls the actuation of said pneumatic cylinder as it moves said magnet rack assembly between said home and end positions.

14. A beltless magnetic conveyor assembly as set forth in claim 13 wherein said indexing drive system includes a pair of pneumatic cylinders supported within said housing and a cylinder connector extending between said pair of pneumatic cylinders, said cylinder connector operatively coupled to said magnetic rack assembly to impart rectilinear, indexing movement thereto.

\* \* \* \* \*

UNITED STATES PATENT AND TRADEMARK OFFICE
CERTIFICATE OF CORRECTION

PATENT NO. : 6,311,832 B1
DATED : November 6, 2001
INVENTOR(S) : Kwasniewicz

It is certified that error appears in the above-identified patent and that said Letters Patent is hereby corrected as shown below:

<u>Column 10,</u>
Line 12, "farther" should read -- further --.

Signed and Sealed this

Nineteenth Day of March, 2002

Attest:

Attesting Officer

JAMES E. ROGAN
Director of the United States Patent and Trademark Office